(12) United States Patent
Hagiwara

(10) Patent No.: US 8,404,882 B2
(45) Date of Patent: Mar. 26, 2013

(54) ONE-TERMINAL REACTIVE ORGANOPOLYSILOXANE HAVING A POLYALKYLENEOXIDE GROUP AT THE OMEGA-TERMINAL AND A METHOD FOR THE PREPARATION THEREOF

(75) Inventor: Mamoru Hagiwara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 154 days.

(21) Appl. No.: 12/890,456

(22) Filed: Sep. 24, 2010

(65) Prior Publication Data

US 2011/0077422 A1  Mar. 31, 2011

(30) Foreign Application Priority Data

Sep. 25, 2009 (JP) ................. 2009-221036

(51) Int. Cl.
 *C07F 7/00* (2006.01)
(52) U.S. Cl. ........ 556/433; 556/446; 556/425; 556/434; 556/435
(58) Field of Classification Search .................. 556/446, 556/433, 434, 435, 425
See application file for complete search history.

(56) References Cited

U.S. PATENT DOCUMENTS

| | | | | |
|---|---|---|---|---|
| 5,329,034 | A | * | 7/1994 | Nagase et al. ................. 556/415 |
| 5,624,680 | A | * | 4/1997 | Nagase et al. ................. 424/448 |
| 6,916,488 | B1 | * | 7/2005 | Meier et al. ................... 424/450 |
| 2006/0258772 | A1 | * | 11/2006 | Sugihara et al. .............. 523/122 |
| 2008/0269429 | A1 | | 10/2008 | Arkles et al. |
| 2008/0312134 | A1 | * | 12/2008 | Hirt et al. .......................... 514/2 |
| 2009/0299022 | A1 | | 12/2009 | Ichinohe |

FOREIGN PATENT DOCUMENTS

| | | |
|---|---|---|
| JP | 59-78236 A | 5/1984 |
| JP | 59-25808 B2 | 6/1984 |
| JP | 61-29379 B2 | 7/1986 |
| JP | 5-93136 A | 4/1993 |
| JP | 7-224168 A | 8/1995 |
| JP | 7-233177 A | 9/1995 |
| JP | 2001-55446 A | 2/2001 |
| JP | 2008-202060 A | 9/2008 |
| JP | 2008-274278 A | 11/2008 |

\* cited by examiner

*Primary Examiner* — Sudhakar Katakam
*Assistant Examiner* — Pancham Bakshi
(74) *Attorney, Agent, or Firm* — Birch, Stewart, Kolasch & Birch, LLP

(57) ABSTRACT

The present invention relates to a one-terminal reactive organopolysiloxane further having a hydrophilic polyalkyleneoxide group at the omega-terminal and a method for its production. Thus, the present invention provides a one-terminal reactive organopolysiloxane which is characterized by having a polyalkyleneoxide at the omega-terminal, and composed of blocks arranged in the following order:

A—B—C—Y wherein A is a monovalent polyalkyleneoxide group having an alkoxy group at a terminal, B is a substituted or unsubstituted divalent alkylene group, C is a divalent polysiloxane group, Y is a monovalent group selected from the group consisting of an alkyl group having a reactive group, a hydrogen atom, a styryl group and a trialkoxysiloxy group, and provides a method for the preparation thereof.

6 Claims, 1 Drawing Sheet

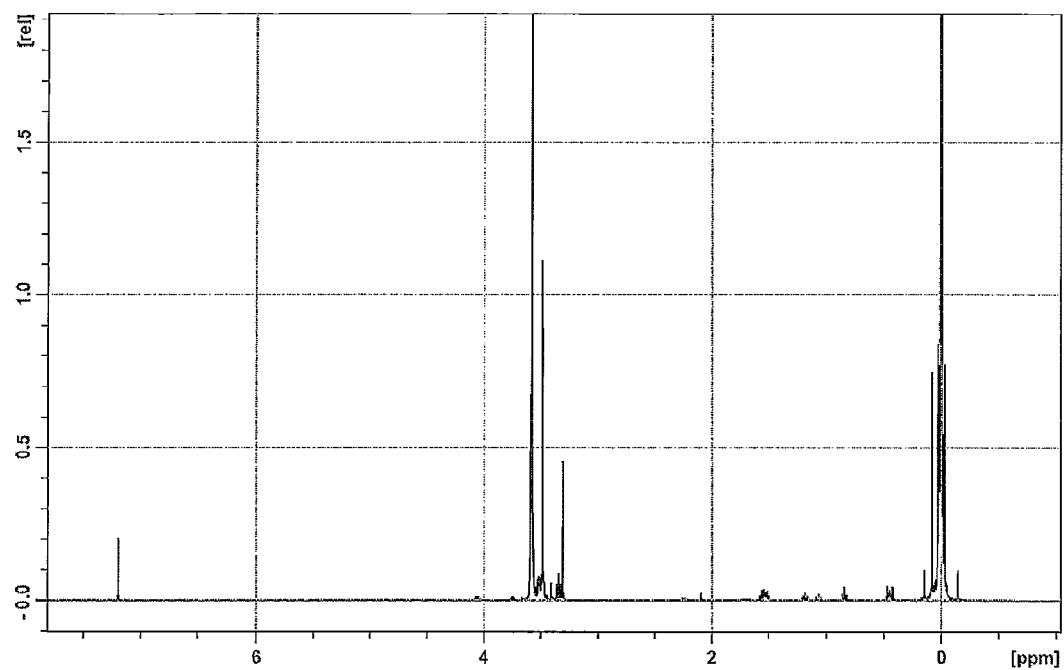

ONE-TERMINAL REACTIVE ORGANOPOLYSILOXANE HAVING A POLYALKYLENEOXIDE GROUP AT THE OMEGA-TERMINAL AND A METHOD FOR THE PREPARATION THEREOF

CROSS REFERENCE

This application claims the benefits of Japanese Patent Application No. 2009-221036 filed on Sep. 25, 2009, the contents of which are herein incorporated by reference.

FIELD OF THE INVENTION

The present invention relates to a one-terminal reactive organopolysiloxane further having a hydrophilic polyalkyleneoxide group at the omega-terminal and a method for its production.

BACKGROUND OF THE INVENTION

It is known that an organopolysiloxane having a (meth) acryl group at one terminal is synthesized by ring-opening polymerization of hexamethylcyclotrisiloxane. For example, Japanese Patent Application Laid-Open No. Sho-59-78236 describes a method for the synthesis of an organopolysiloxane having a (meth)acryl group at one terminal by subjecting hexamethylcyclotrisiloxane to ring-opening polymerization, wherein lithium trimethylsilanolate is used as a polymerization initiator, and terminating the polymerization by 3-(2-methacryloxy ethoxy)propyl dimethyl chlorosilane.

Further, Japanese Patent Application Laid-Open No. Hei-7-224168 describes a method for the synthesis of organopolysiloxane having a (meth)acryl group at one terminal by subjecting hexamethylcyclotrisiloxane to ring-opening polymerization in the presence of pentacoordinate silicon catalyst, wherein trimethylsilanol or 3-methacryloxypropyl dimethylsilanol is used as a polymerization initiator, and terminating each polymerization by 3-methacryloxypropyl dimethylchlorosilane or trimethylchlorosilane.

However, these one-terminal reactive organopolysiloxanes are siloxane polymers consisting of hydrophobic segments. There are few examples for a one-terminal reactive organopolysiloxane having a hydrophilic group (Japanese Patent Application Laid-Open No.2008-274278).

Polyoxyalkylene compounds having a hydrolyzable silyl group, which is reactive, at a terminal is described in Japanese Patent Publication No. Sho-59-25808 and Japanese Patent Publication No. Sho-61-29379, and are used as a hydrophilic silane coupling agent. However, these polyoxyalkylene compounds do not have a siloxane chain.

An organopolysiloxane having a hydrophilic group is a block copolymer composed of hydrophilic segments and hydrophobic segments. The hydrophilic segments associate with each other, and the hydrophobic segments associate with each other, resulting in microphase separation. Taking advantage of such a phenominon, this polysiloxane is used in cosmetics and various paints, but requires further improvements, such as an introduction of more-reactive group for applications which require durability.

Japanese Patent Application Laid-Open No. 2001-55446 and Japanese Patent Application Laid-Open No. 2008-202060 describe one-terminal reactive polysiloxanes having a hydrophilic group. However, in these one-terminal reactive polysiloxanes, the hydrophilic group is located between the block having a reactive group and the polysiloxane block. Therefore, in a case where the polysiloxane is used in paints, such a problem occurs that the hydrophilic group is covered with the siloxane segment, which prevents the microphase separation from occurring on a surface of a coating.

Patent Literature 1: Japanese Patent Application Laid-Open No. Sho-59-78236

Patent Literature 2: Japanese Patent Application Laid-Open No. Hei-7-224168

Patent Literature 3: Japanese Patent Application Laid-Open No. 2008-274278

Patent Literature 4: Japanese Patent Publication No. Sho-59-25808

Patent Literature 5: Japanese Patent Publication No. Sho-61-29379

Patent Literature 6: Japanese Patent Application Laid-Open No. 2001-55446

Patent Literature 7: Japanese Patent Application Laid-Open No. 2008-202060

SUMMARY OF THE INVENTION

Problems to be Solved by the Invention

To solve the afore-mentioned problem, the present inventors have made research to synthesize a reactive polyorganosiloxane having a hydrophilic group at an omega-terminal. However, the functionalization of one terminal of the reactive polysiloxane is difficult and, therefore, a method for the synthesis of a reactive polyorganosiloxane further having a hydrophilic group at an omega-terminal has not yet been reported.

Means to Solve the Problem

The inventor has found that a one-terminal reactive organopolysiloxane further having a polyalkyleneoxide at an omega-terminal can be obtained by subjecting hexamethylcyclotrisiloxane to ring-opening polymerization, wherein a silanol compound having a hydrophilic polyalkyleneoxide at the omega-terminal is used as a polymerization initiator, to synthesize an alpha-terminal silanol-modified organopolysiloxane, which is then reacted with a specific compound.

Thus, the present invention provides a one-terminal reactive organopolysiloxane having a polyalkyleneoxide at an omega-terminal, composed of blocks arranged in the following order:

A-B—C—Y wherein A is a monovalent polyalkyleneoxide group having an alkoxy group at a terminal, B is a substituted or unsubstituted divalent alkylene group, C is a divalent polysiloxane group, Y is a monovalent group selected from the group consisting of an alkyl group having a reactive group, a hydrogen atom, a styryl group and a trialkoxysiloxy group, and provides a method for the preparation thereof.

Effects of the Invention

The one-terminal reactive organopolysiloxane of the present invention further has a hydrophilic polyalkyleneoxide at the omega-terminal. Therefore, when the alpha-terminal of the organopolysiloxane is subjected to a reaction to form a silicone-grafted polymer, a coating having a good surface property can be provided.

BRIEF DESCRIPTION ON THE DRAWING

FIG. 1 is a chart of $^1$H-NMR spectra of the compound prepared in Example 1.

BEST MODES OF THE INVENTION

The present invention is a one-terminal reactive organopolysiloxane which is characterized by having a polyalkyleneoxide at the omega-terminal, and composed of blocks arranged in the following order:

A-B—C—Y wherein A is a monovalent polyalkyleneoxide group having an alkoxy group at a terminal, B is a substituted or unsubstituted divalent alkylene group, C is a divalent polysiloxane group, Y is a monovalent group selected from the group consisting of an alkyl group having a reactive group, a hydrogen atom, a styryl group and a trialkoxysiloxy group.

An example of the organopolysiloxane composed of the above-mentioned blocks is an organopolysiloxane represented by the following formula (1).

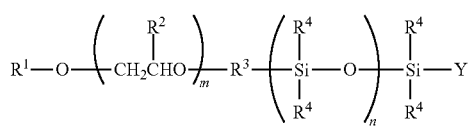

In formula (1), $R^1$ is an alkyl group having 1 to 10 carbon atoms, $R^2$ is a hydrogen atom or methyl group, $R^3$ is an alkylene group having 1 to 10 carbon atoms, $R^4$ is, independently of each other, a group having 1 to 10 carbon atoms selected from the group consisting of an alkyl group, an alkenyl group and an aryl group, m is an integer of from 1 to 100, preferably from 5 to 50, more preferably from 10 to 30, and n is an integer of from 5 to 300, preferably from 10 to 150, more preferably from 20 to 50.

In formula (1), Y is a monovalent group selected from the group consisting of an alkyl group having a reactive group, a hydrogen atom, a styryl group and a trialkoxy siloxy group. Examples of the reactive group include a (meth)acryl group, a (meth)acrylamide group, an amino group, an epoxy group and an acid anhydride group. The alkyl group and the aloxy group preferably have 1 to 10 carbon atoms. Among these, preferred are an alkyl group which has a (meth)acryl group or a (meth)acrylamide group, and a trialkoxysiloxy group.

Examples of Y include those represented by the following formulas.

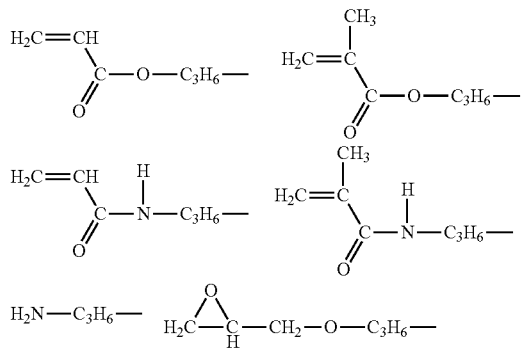

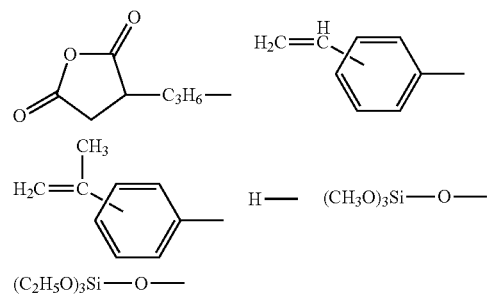

The present invention also provides a method suitable for preparing the afore-mentioned one-terminal reactive organopolysiloxane having a polyalkyleneoxide at the omega-terminal. In this method, a polyalkyleneoxide-modified silanol represented by the following formula (2):

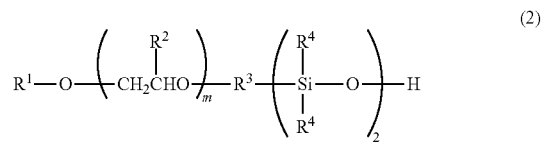

wherein $R^1$, $R^2$, $R^3$, $R^4$ and m are as defined above, is reacted with hexamethylcyclotrisiloxane to prepare an intermediate represented by the following formula (3)

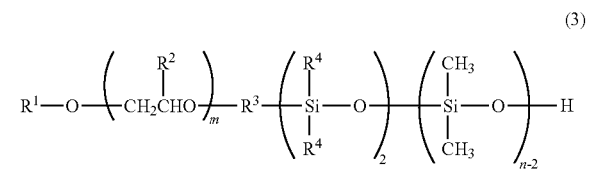

wherein $R^1$, $R^2$, $R^3$, $R^4$, m and n are as defined above.

Next, the afore-mentioned intermediate represented by the formula (3) is reacted with an organosilicon compound which is reactive with a silanol, whereby the organopolysiloxane of the present invention can be obtained. Examples of the organosilicon compound include those represented by any one of the following general formulas (4) to (8):

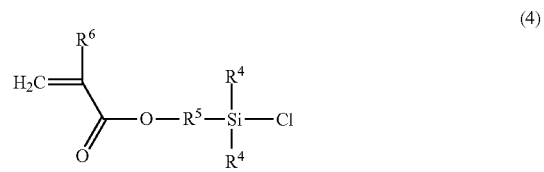

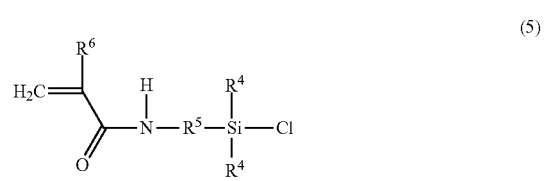

-continued

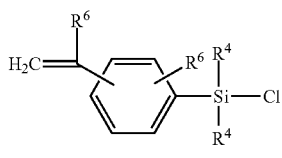
(6)

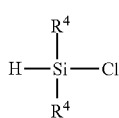
(7)

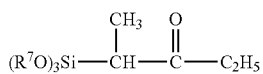
(8)

wherein $R^4$ is, independently of each other, a group having 1 to 10 carbon atoms selected from the group consisting of an alkyl group, an alkenyl group and an aryl group, $R^5$ is an alkylene group having 1 to 10 carbon atoms, $R^6$ is a hydrogen atom or a methyl group and $R^7$ is a methyl group or an ethyl group.

More specific examples of the organosilicon compound include those represented by the following formulas.

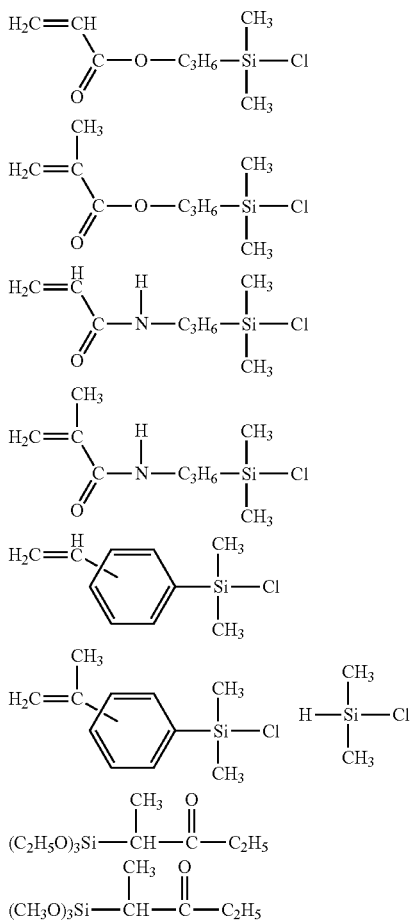

The present organopolysiloxane can also be prepared by reacting the afore-mentioned intermediate represented by the formula (3) with dimethylchlorosilane to prepare an organopolysiloxane having a terminal SiH group, which is then subjected to an additional reaction with a vinyl group-containing compound which is represented by the following formula (9), (10) or (11):

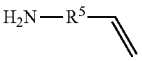
(9)

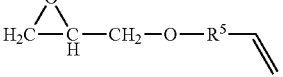
(10)

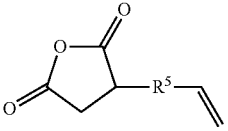
(11)

wherein $R^5$ is as defined above.

The pathway for the afore-mentioned synthesis will be described below in more detail.

(i) Synthesis of the polyalkyleneoxide-Modified silanol

The afore-mentioned polyalkyleneoxide-modified silanol represented by the general formula (2) can be obtained by subjecting the terminal vinyl group of a polyoxyalkylene represented by the following formula to an additional reaction, i.e. hydrosilylation, with one Si—H group of tetramethyldisiloxane, and subsequently converting the remaining Si—H group of tetramethyldisiloxane into a silonol group,

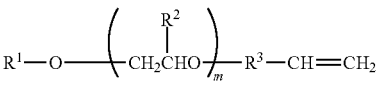

wherein $R^1$ is an alkyl group having 1 to 10 carbon atoms, $R^2$ is a hydrogen atom or a methyl group, m is an integer of from 1 to 100, preferably from 5 to 50, more preferably from 10 to 30.

The polyoxyalkylene and tetramethyldisiloxane are fed in a ratio of from 6 to 40 equivalents, particularly 10 to 30 equivalents, of the Si—H group of tetramethyldisiloxane, per equivalent of the vinyl group of the polyoxyalkylene. In this additional reaction, obtained are a compound where the polyoxyalkylene is added to one terminal of tetramethyldisiloxane and a compound where the polyoxyalkylene is added to both terminal of the tetramethyldisiloxane. However, the siloxane compound having the Si—H group at the one terminal can be prepared in the ratio of 95% or more, using a largely excess equivalent amount of tetramethyldisiloxane, relative to the equivalent amount of the polyoxyalkylene. The additional reaction may be carried out with no solvent or in the presence of a solvent such as an ether solvent, an aromatic solvent and an aliphatic hydrocarbon solvent. Among these, toluene is preferred. In the present invention, the compound where the polyoxyalkylene is added to both terminal of the tetramethyldisiloxane may be use without being sapareted in the subsequent reaction.

A catalyst may be used in the additional reaction. Any known catalyst can be used, such as, for example, a platinum catalyst or a palladium catalyst, but is not limited to these. Particularly, preffered is a neutral platinum catalyst, such as, a zero-valent platinum catalyst where an unsaturated compound is coordinated. More specifically, hexachloroplatinic (IV) acid hexahydrate, a platinum carbonyl vinyl methyl complex, a platinum-divinyltetramethyldisiloxane complex, a platinum-cyclovinylmethylsiloxane complex, a platinum-octylaldehyde/octanol complex or platinum supported on activated coal may be used. Among these, a tetramethyldivinyldisiloxane-coordinated, zero-valent platinum catalyst is preffered. The catalyst is preferably used in an amount of from 1 to 50 ppm, more preferably from 3 to 20 ppm, of platinum metal relative to the amount of the polyoxyalkylene.

The additional reaction is carried out preferably at a temperature of 30 to 150 degrees C., particularly 80 to 120 degrees C., for 1 to 5 hours. When the reaction is carried out in a closed system such as an autoclave, the reaction time can be reduced, and the conversion in the hydrosilylation can be increased.

Next, the siloxane compound having an Si—H group at one terminal is subjected to dehydrogenation in the presence of water, whereby the Si—H group is converted into a silanol group. The water used in the reaction is used in a molar amount at least equal to, preferably 3 to 10 times, relative to the molar amount of the Si—H group. A catalyst such as a platinum catalyst, a palladium catalyst or a hydroxylamine catalyst, for example, a palladium carbon, may be used. The catalyst is used in such an amount of that the amount of the metal is from 40 to 200 ppm, preferably from 60 to 150 ppm, relative to the amount of the polyoxyalkylene having the Si—H bond at one terminal. Further, a solvent may be used in this silanol forming reaction, if needed. Preferred is a water-soluble solvent such as a ketone, an alcohol or an ether. The silanol forming reaction may be carried out at a temperature of 30 to 150 degrees C., preferably 50 to 100 degrees C.

(ii) Synthesis of the Intermediate

The intermediate represented by the formula (3) can be obtained by subjecting hexametylcyclotrisiloxane to ring-opening polymerization of the afore-mentioned silanol compound. Hexametylcyclotrisiloxane is used in an amount of 1 to 100 equivalents, preferably 4 to 50 equivalents, relative to one equivalent of the hydroxyl group of the silanol compound. This ring-opening polymerization is carried out in the presence of a polymerization catalyst. Any known polymerization catalyst can be used. Preferred is a pentacoordinate silicon catalyst represented by the following formula (12), as described in Japanese Patent Publication No. Sho-45-1070:

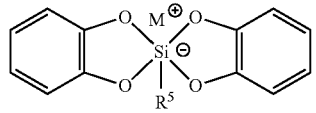

(12)

wherein $R^5$ is a substituted or unsubstituted monovalent hydrocarbon group, and M is Li, Na, K, $NH_4$ or $C_6H_5CH_2N(CH_3)_3$. $R^5$ is preferably a monovalent hydrocarbon group having 1 to 12 carbon atoms.

Examples of the pentacoordinate silicon catalyst include those represented by the following formulas.

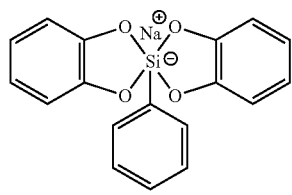

-continued

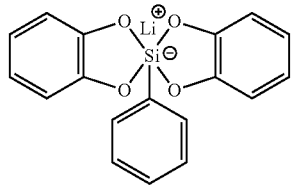

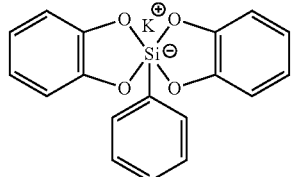

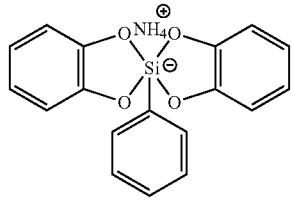

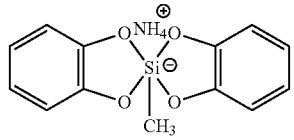

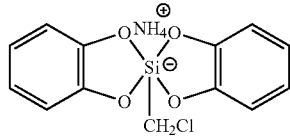

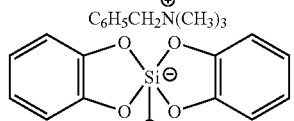

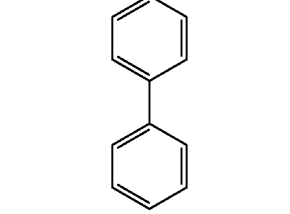

Among these, a pentacoordinate silicon catalyst which has an alkali metal as a counterion is preferred, because the synthesis is easy, the stability over time is good and the polysiloxane obtained in the polymerization is better monodisperse. The pentacoordinate silicon catalyst represented by the following formula is particularly preferred.

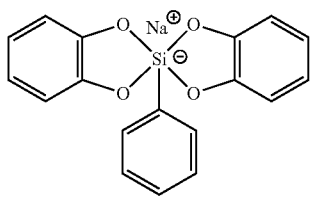 [SMILES: c1ccc([Si-]23(Oc4ccccc4O2)Oc2ccccc2O3)cc1 ; [Na+]]

The pentacoordinate silicon catalyst used in the reaction is used preferably in an amount of 100 to 1000 ppm, more preferably 200 to 500 ppm, relative to the amount of hexametylcyclotrisiloxane.

The ring-opening polymerization may be carried out in the presence of a solvent. A polar solvent or a polar solvent which does not contain an active hydrogen can be used as the reaction solvent, such as, for instance, acetonitrile, tetrahydrofuran, 1,4-dioxane, methylethylketone, methylisobutylketone, dimethyl sulfoxide, dimethylformamide, hexane, toluene and xylene. Among these, acetonitrile is preferred. The reaction solvent is preferably dehydrated by a drying agent such as molecular sieves.

Reaction conditions for the ring-opening polymerization may properly be selected. A reaction temperature may be 50 to 100 degree C., preferably 60 to 80 degree C., and a reaction time is 1 to 20 hours. According to the afore-mentioned reaction, the intermediate having a polyalkyleneoxide at the omega-terminal and a silanol at the alpha-terminal can be obtained.

(iii) Synthesis of the One-Terminal Reactive organopolysiloxane

The intermediate obtained in the afore-mentioned reaction is reacted with an organosilicon compound which is reactive with a silanol. As the organosilicon compound, the organochlorosilan represented by the afore-mentioned formulas (4) to (7), or ketene silyl acetal represented by the afore-mentioned formula (8) may be used.

The organochlorosilan represented by the afore-mentioned formulas (4) to (7) may be used in an amount of 1.0 to 1.5 moles, preferably 1.0 to 1.2 moles, relative to one mole of the intermediate represented by the afore-mentioned formula (3).

The additional reaction with the organochlorosilan is carried out by dropping the organochlorosilan directly into the reaction solution obtained after the preparation of the intermediate. This additional reaction is carried out preferably in the presence of a hydrochloric acid scavenger. Examples of the hydrochloric acid scavenger include various kinds of amine, for instance, pyridine and triethylamine, with triethylamine being preferred. In a case where organochlorosilan has a (meth)acryl group, dibutyl hydroxytoluene (BHT) is preferably added to prevent polymerization of the (meth) acryl group. The reaction conditions are preferably such a reaction temperature of 20 to 100 degrees C., particularly 50 to 80 degrees C., and a reaction time of 1 to 10 hours. After the end of the reaction, methanol is added to deactivate the remaining chlorosilan, and reaction solvent is removed by stripping at a 100 degrees C./10 mmHg. According to this process, the one-terminal reactive organopolysiloxane having the polyalkyleneoxide at the omega-terminal can be obtained.

The ketene silyl acetal represented by the afore-mentioned formula (8) may be used in an amount of 1.0 to 3.0 moles, preferably 1.5 to 2.0 moles, relative to one mole of the intermediate represented by the afore-mentioned formula (3).

The additional reaction using the ketene silyl acetal is carried out by dropping the ketene silyl acetal directly into the reaction solution obtained after the preparation of the intermediate. Reaction conditions are preferably a reaction temperature of 50 to 80 degrees C., particularly 60 to 70 degrees C., and a reaction time of 1 to 10 hours. After the end of the reaction, methanol is added to deactivate the catalyst, and the reaction solvent is removed by stripping at a 100 degrees C./10 mmHg. According to this process, the one-terminal reactive organopolysiloxane having the polyalkyleneoxide at the omega-terminal can be obtained.

Alternatively, the present organopolysiloxane can be obtained as follows: an organopolysiloxane having a terminal Si—H group is obtained by reacting the intermediate represented by the afore-mentioned formula (3) with dimethylchlorosilan according to the afore-mentioned reaction with an organochlorosilan, and then reacted with a vinyl group-containing compound represented by the afore-mentioned formula (9), (10) or (11). Any known method can be used for the additional reaction between the Si—H group and the vinyl group, and is not limited. The vinyl group-containing compound is used in an amount of 1 to 3 equivalents, relative to one equivalent of the Si—H group of the organopolysiloxane. Any unreacted vinyl group-containing compound can be removed at the same time as when the solvent is removed after the end of the reaction. The reaction is preferably carried out at a temperature of 30 to 150 degrees C., preferably 80 to 120 degrees C., for 1 to 5 hours.

The one-terminal reactive organopolysiloxane having a (meth)acryl group, a (meth)acrylamide group or a styryl group at the alpha-terminal can copolymerize with a vinyl monomer to provide a graft copolymer which has good water repellency, releasing property, lubricating property, weather resistance and gas permeability. Further, the one-terminal reactive organopolysiloxane having an alkoxysilyl group, a hydrosilyl group, an epoxy group, an amino group or an acid anhydride group at the alpha-terminal can be used as a surface treatment agent such as a silan coupling agent and a hard coat agent.

EXAMPLES

The present invention will be explained more specifically with reference to the following Examples. However, the present invention shall not be limited thereto.

The measuring apparatus used in the Examples are as follows.

Infrared spectrophotometer: SPECTRUM 2000, produced by PERKIN ELMER Co., Ltd
GPC: HLC-8220, produced by TOSO Co., Ltd
NMR: AVANCE 111-400, produced by Buruker Co., Ltd, $^1$H-NMR Example 1

(i) Synthesis of a polyalkyleneoxide-Modified silanol

To a three-litter flask equipped with a stirrer, a thermometer, a reflux condenser, and a dropping funnel were added 400 g of ω-methoxy polyethyleneglycol monoallylether (Mw 550), 974 g of 1,1,3,3-tetramethyldisiloxane (molar ratio of Si—H group/Si-Vi group, 20), 500 g of a toluene and 0.48 g of a toluene solution of a tetramethyldivinyldisiloxane-coordinated zero-valent platinum catalyst containing 0.5% by weight of platinum metal (6 ppm of platinum metal), and heated at 70 degrees C. for 5 hours to react. The reaction mixture was subjected to stripping to remove volatiles to obtain 484 g of a light brown viscous liquid product. The absorption (2,125cm$^{-1}$) by the Si—H bond of the product was confirmed by an infrared spectrophotometer. The average molecular weight was 690, as determined by the amount of the produced hydrogen gas.

To a five-hundred milliliter flask equipped with a thermometer, a tubular condenser and a stirrer were added 300 g of the afore-mentioned product, 150 g of tetrahydrofuran and 1.5 g of palladium carbon containing 2.0% by weight of palladium metal (100 ppm of palladium metal), to which 15 g of water was added dropwise in an ice bath, and heated to 70 degrees C. for hours to react. Then, the reaction mixture was subjected to stripping to remove the volatiles. After removal of the palladium carbon by filtration, 286 g of a light brown viscous liquid product was obtained.

The afore-mentioned product was subjected to infrared spectrophotometry. The absorption by the Si—H bond (2,125 cm$^{-1}$) was not seen and absorption by the Si—OH bond (3,400 cm$^{-1}$) was confirmed. The conversion was approximately 100%, as determined by calculating the amount of the remaining Si—H bond, based on the amount of the hydrogen gas produced. A weight-average molecular weight of the product, reduced to polystyrene, was approximately 700, as determined by gel permeation chromatography (GPC). Therefore, the product obtained was the silanol compound represented by the following formula (13).

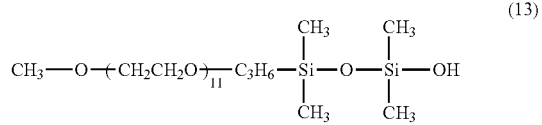
(13)

(ii) Synthesis of an Intermediate

To a five-hundred milliliter flask equipped with a thermometer, a further condenser and a stirrer were added 140 g of the silanol compound represented by afore-mentioned formula (13), 444 g of hexamethylcyclotrisiloxane and 196 g of dehydrated acetonitrile, and heated to 50 degrees C. in an oil bath to prepare a homogenous solution. To the reaction mixture, 0.156 g of a pentacoordinate silicon catalyst represented by the following formula (14) was added, and stirred at 60 degrees C. for 3 hours to allow polymerlyzation.

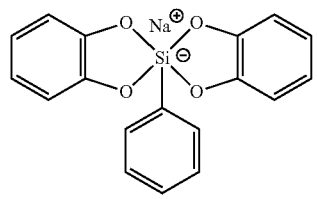
(14)

(iii) Synthesis of a One-Terminal Reactive organopolysiloxane

Then, 88.8 g of ketene silyl acetal (0.43 mol) represented by the following formula (15) was added dropwise to the reaction mixture at 10 degrees C., stirred at 70 degrees C. for 3 hours to react. Then, 84 g of methanol was added to deactivate the catalyst. The mixture was subjected to stripping at 100 degrees C./10 mm Hg to remove the solvent and slight amounts of low volatiles, and filtrated with activated carbon to remove the polymerization catalyst to obtain a transparent, light brown oil product. The amount of the product was 560 g and the yield based on the silanol compound represented by the formula (13) was 97.0%.

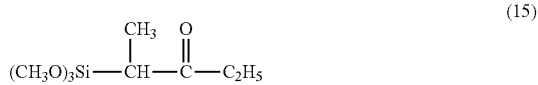
(15)

The product obtained was subjected to measurement of a viscosity at 25 degrees C., a specific gravity, a refractive index and a weight-average molecular weight as determined by gel permeation chromatography.

Viscosity: 100 mm$^2$/s
Specific gravity: 0.999
Refractive index: 1.4139
Weight-average molecular weight: 2900

The product obtained was analyzed by $^1$H-NMR and was found to be a compound represented by the following formula (16). The $^1$H-NMR spectra are shown in FIG. 1.

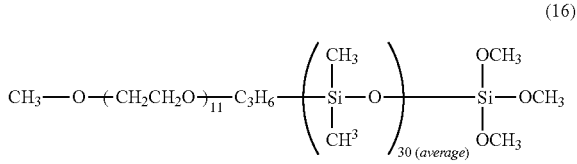
(16)

Example 2

The silanol compound represented by the afore-mentioned formula (13) was prepared as in Example 1, and subjected to polymerization with hexacyclotrisiloxane. After the polymerization, 0.11 g of butylated hydroxytoluene (BHT), 24.0 g of pyridine and 82 g of toluene were added to the reaction mixture with stirring, and cooled in an ice bath. 45.3 Grams of methacryloyl propyl dimethyl chlorosilane (0.21 mol) was added dropwise. Then, the reaction mixture was heated at 70 degrees C. for 2 hours with stirring to cap the end. 20 Grams of methanol was added to deactivate the remaining chlorosilane. Then, the reaction mixture was subjected to stripping at 100 degrees C./10 mm Hg to remove the toluene and slight amounts of low volatiles, and filtrated with activated carbon to remove the polymerization catalyst to obtain a transparent, light brown oil product. The amount of the product was 581 g and the yield based on the silanol compound represented by the formula (13) was 98.0%. The product obtained was found to be a compound represented by the following formula (17).

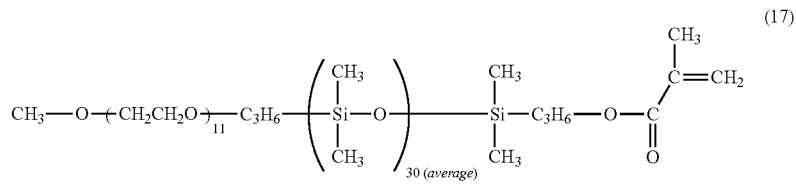
(17)

INDUSTRIAL APPLICABILITY

The present one-terminal reactive organopolysiloxane can provide a silicone graft polymer with good surface properties on account of the polyalkyleneoxide at the omega-terminal, and is useful as an intermediate to synthesize graft copolymers which are available as a water repellent agent for concrete, a protective coating against a posters, an undersea antifouling coating, a weather resistant coating, an antisticking agent for a thermal-transfer recording film, a protective coating against water landing or snow accretion, cosmetic materials and contact lens materials.

The invention claimed is:

1. A one-terminal reactive organopolysiloxane having a polyalkyleneoxide at an omega-terminal, composed of blocks arranged in the following order:

A-B—C—Y wherein
   A is a monovalent polyalkyleneoxide group having an alkoxy group at a terminal,
   B is a substituted, or unsubstituted divalent alkylene group,
   C is a divalent polysiloxane group, and
   Y is a monovalent group selected from the group consisting of
   an alkyl group having a reactive group selected from the group consisting of (meth)acryl groups, (meth)acrylamide groups, amino groups, epoxy groups, and acid anhydride groups,
   a hydrogen atom,
   a styryl group and
   a trialkoxysiloxy group.

2. The one-terminal reactive organopolysiloxane according to claim 1, wherein the organopolysiloxane is represented by the following formula (1):

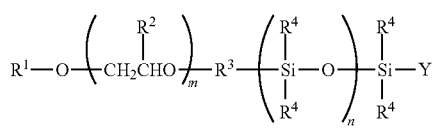

(1)

wherein
$R^1$ is an alkyl group having 1 to 10 carbon atoms,
$R^2$ is a hydrogen atom or a methyl group,
$R^3$ is an alkylene group having 1 to 10 carbon atoms,
$R^4$ is, independently of each other, a group having 1 to 10 carbon atoms selected from the group consisting of an alkyl group, an alkenyl group and an aryl group, and
Y is a monovalent group selected from the group consisting of an alkyl group selected from the group consisting of (meth)acryl groups, (meth)acrylamide groups, amino groups, epoxy groups, and acid anhydride groups, a hydrogen atom, a styryl group and a trialkoxysiloxy group, m is an integer of from 1 to 100 and n is an integer of from 5 to 300.

3. A method for preparing the one-terminal reactive organopolysiloxane according to claim 2, wherein a polyalkyleneoxide-modified silanol represented by the following formula (2):

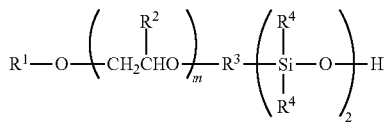

(2)

wherein $R^1$, $R^2$, $R^3$, $R^4$, and m are as defined in claim 2, is reacted with hexamethylcyclotrisiloxane to prepare an intermediate represented by the following formula (3):

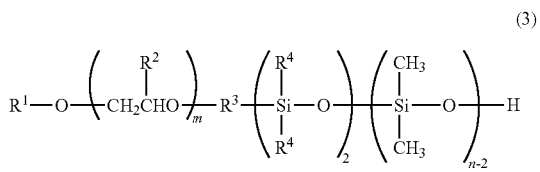

(3)

wherein $R^1$, $R^2$, $R^3$, $R^4$, m, and n are as defined in claim 2, and then the intermediate is reacted with an organosilicon compound which is reactive with a silanol.

4. The method according to claim 3, wherein the organosilicon compound is selected from the group consisting of compounds represented by any one of the following general formulas (4) to (8):

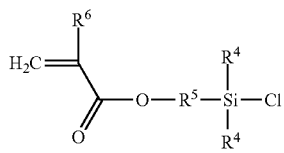

(4)

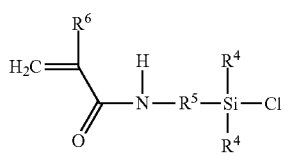

(5)

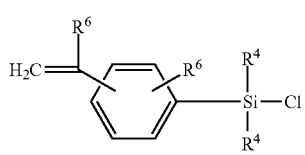

(6)

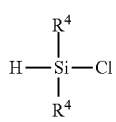

(7)

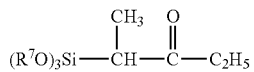

(8)

wherein $R^4$ is as defined above, $R^5$ is an alkylene group having 1 to 10 carbon atoms, $R^6$ is a hydrogen atom or a methyl group and $R^7$ is a methyl group or an ethyl group.

5. A method for preparing the one-terminal reactive organopolysiloxane according to claim 2, wherein a polyalkyleneoxide-modified silanol represented by the following formula (2):

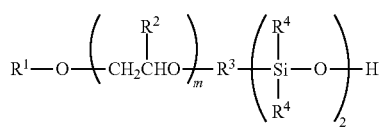

(2)

wherein $R^1$, $R^2$, $R^3$, $R^4$, and m are as defined in claim 2, is reacted with hexamethylcyclotrisiloxane to prepare an intermediate represented by the following formula (3):

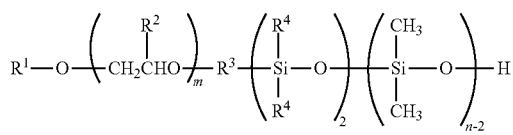

(3)

wherein $R^1$, $R^2$, $R^3$, $R^4$, m, and n are as defined in claim 2, the intermediate is reacted with dimethylchlorosilane to prepare an organopolysiloxane having a terminal SiH group, and then the organopolysiloxane having a terminal SiH group is subjecting to an additional reaction with a compound represented by the following formula (9), (10) or (11):

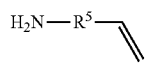

(9)

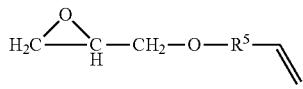

(10)

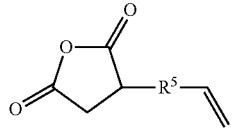

(11)

wherein $R^5$ is an alkylene group having 1 to 10 carbon atoms.

6. The method according to any one of claims 3 to 5, wherein the reaction between the polyalkyleneoxide-modified silanol represented by said formula (2) and hexametylcyclotrisiloxane is carried out in the presence of a pentacoordinate silicon catalyst represented by the following formula (12):

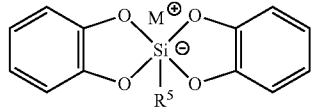

(12)

wherein $R^5$ is a substituted or unsubstituted monovalent hydrocarbon group, and M is Li, Na, K, $NH_4$ or $C_6H_5CH_2N(CH_3)_3$.

* * * * *